United States Patent
Keljo et al.

(10) Patent No.: US 8,082,442 B2
(45) Date of Patent: Dec. 20, 2011

(54) SECURELY SHARING APPLICATIONS INSTALLED BY UNPRIVILEGED USERS

(75) Inventors: Jonathan Keljo, Seattle, WA (US); Charles William Kaufman, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1281 days.

(21) Appl. No.: 11/463,858

(22) Filed: Aug. 10, 2006

(65) Prior Publication Data
US 2008/0052705 A1    Feb. 28, 2008

(51) Int. Cl.
G06F 9/445   (2006.01)
G06F 9/48    (2006.01)
G06F 9/52    (2006.01)

(52) U.S. Cl. ........ 713/164; 717/100; 717/101; 717/120; 717/121; 717/174; 726/1; 726/6; 726/26

(58) Field of Classification Search .................... 713/164
See application file for complete search history.

(56) References Cited

U.S. PATENT DOCUMENTS

| | | | |
|---|---|---|---|
| 5,761,309 A | 6/1998 | Ohashi et al. | |
| 5,774,551 A | 6/1998 | Wu et al. | |
| 5,960,204 A * | 9/1999 | Yinger et al. | 717/176 |
| 6,105,131 A * | 8/2000 | Carroll | 713/155 |
| 6,131,192 A * | 10/2000 | Henry | 717/175 |
| 6,195,796 B1 * | 2/2001 | Porter | 717/122 |
| 6,226,752 B1 | 5/2001 | Gupta et al. | |
| 6,327,705 B1 * | 12/2001 | Larsson et al. | 717/174 |
| 6,505,300 B2 | 1/2003 | Chan et al. | |
| 6,681,391 B1 * | 1/2004 | Marino et al. | 717/175 |
| 6,779,117 B1 | 8/2004 | Wells | |
| 6,892,307 B1 | 5/2005 | Wood et al. | |
| 6,898,711 B1 | 5/2005 | Bauman et al. | |
| 2003/0056102 A1 * | 3/2003 | Aho et al. | 713/176 |
| 2003/0097579 A1 * | 5/2003 | England et al. | 713/193 |
| 2004/0003390 A1 * | 1/2004 | Canter et al. | 717/178 |
| 2004/0103203 A1 | 5/2004 | Nichols et al. | |
| 2004/0111644 A1 | 6/2004 | Saunders et al. | |
| 2004/0143830 A1 * | 7/2004 | Gupton et al. | 717/174 |
| 2004/0255291 A1 * | 12/2004 | Sierer et al. | 717/174 |
| 2005/0066324 A1 * | 3/2005 | Delgado et al. | 717/170 |
| 2005/0278541 A1 | 12/2005 | See et al. | |
| 2005/0289642 A1 | 12/2005 | Pacholec et al. | |

OTHER PUBLICATIONS

Butler, Randy, et al., "A National-Scale Authentication Infrastructure", pp. 60-66, 2000 IEEE http://ieeexplore.ieee.org/xpls/abs_all.jsp?arNumber=889094.

(Continued)

*Primary Examiner* — David Pearson
*Assistant Examiner* — Kenneth Chang
(74) *Attorney, Agent, or Firm* — Workman Nydegger

(57) ABSTRACT

In one embodiment of this invention, a computer system performs a method for securely sharing applications installed by unprivileged users. The method involves the computer system receiving a user associated command from a user of the computer system. A previous application installation included installing an application manifest and application data objects in a shared repository and installing a user manifest and user configuration data objects in a private repository for an initial installing user. The computer system verifies that a digital signature of the application manifest corresponds to a public key of a user manifest for the associated user. The computer system verifies that an application identifier of the application manifest matches an application identifier of the user manifest. The computer system verifies that the data objects belong to the software application by comparing the application data objects to one or more data object identifiers in the application manifest.

11 Claims, 3 Drawing Sheets

OTHER PUBLICATIONS

Jaeger, Trent, et al., "Flexible Control of Downloaded Executable Content", ACM Transactions on Information and System Security, vol. 2, No. 2, May 1999, pp. 177-228, http://delivery.acm.org/10.1145/320000/317091/p177-jaeger.pdf?key1=317091&key2=.2793710511&coll=Portal&dl=GUIDE&CFID=74220359&CFTOKEN=9279055.

Venkatakrishnan, V.N., et al., "An Approach for Secure Software Installation", 2002 Lisa XVI—Nov. 3-8, 2002—Philadelphia, PA, pp. 221-228, http://seclab.cs.sunysb.edu/seclab1/pubs/papers/lisa02.pdf.

Dolstra, Eelco, "Secure Sharing Between Untrusted Users in a Transparent Source/Binary Deployment Model", 2005, pp. 154-163, http://delivery.acm.org/10.1145/1110000/1101933/p154-dolstra.pdf?key1=1101933&key2=4729710511&coll=Portal&dl=GUIDE& CFID=78279548&CFTOKEN=96905832.

* cited by examiner

SECURELY SHARING APPLICATIONS INSTALLED BY UNPRIVILEGED USERS

BACKGROUND

Computers are ubiquitous in today's society. Computers of all types are used to perform a variety of tasks. Computers accomplish tasks by processing software applications. Software applications are programs that allow a user to interface with and perform one or more tasks on a computer system. In order to function efficiently, software applications are generally installed in the computer's operating system. An application can be installed either machine-wide, in which case it is available to all users of a particular computer, or per-user, in which case it is available only to a single user (typically the user who installed the application). Typically, in an effort to keep the operating system secure, the operating system limits the type of computer users that are allowed to install applications machine-wide. Users that are allowed to install applications machine-wide (i.e., that have sufficient privileges) are often referred to as administrators, or in some cases, power users.

Allowing all users to install applications machine-wide is typically not desirable since untrained and/or malicious users could install applications that detrimentally affect the operating system, the computer system, and/or the data belonging to any user who runs the application. For example, unwanted applications, such as viruses or spyware, can cause damage to the operating system, the computer system, and/or the data belonging to any user who accidentally runs them. Thus, limiting the type of users that have sufficient privileges to install applications machine-wide can limit the risk of malicious applications being able to affect all users of a computer.

Unprivileged users therefore typically will install applications in a per-user fashion, such that the applications are available only to the user who installed them. This leads to several issues.

For example, consider the case where multiple unprivileged users each install Application Z. The computer will have multiple versions of Application Z installed—one version for every user that installed Application Z. This places a heavy burden on computer resources such as hard disk space. Furthermore, if an issue is discovered with Application Z that requires an update, each user's copy of Application Z must be updated, either by the users themselves or by an administrator.

Furthermore, in cases where multiple unprivileged users are simultaneously using an application that was separately installed by each unprivileged user, the computer allocates a portion of random access memory (RAM) for each user. Such allocations of RAM can severely affect the computer's ability to efficiently process the application for each user.

BRIEF SUMMARY

Embodiments of the present invention are directed to systems and methods for securely sharing applications installed by unprivileged users. In one embodiment of this invention, a computer system performs a method for securely sharing applications installed by unprivileged users. The method involves the computer system receiving a user associated command from a user of the computer system. The user associated command for instantiating a software application was previously installed at the computer system. The previous installation included installing an application manifest and application data objects in a shared repository and installing a user manifest and user configuration data objects (e.g., including executable files) in a private repository for an initial installing user. The computer system verifies that a digital signature of the application manifest corresponds to a public key of a user manifest for the associated user. The computer system verifies that an application identifier of the application manifest matches an application identifier of the user manifest. The computer system verifies that the data objects belong to the software application by comparing the application data objects to one or more data object identifiers in the application manifest.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments of the present invention are directed to systems and methods for securely sharing applications installed by unprivileged users. In one embodiment of this invention, a computer system performs a method for securely sharing applications installed by unprivileged users. The method involves the computer system receiving a user associated command from a user of the computer system. The user associated command for instantiating a software application was previously installed at the computer system. The previous installation included installing an application manifest and application data objects (e.g., including executable files) in a shared repository and installing a user manifest and user configuration data objects in a private repository for an initial installing user. The computer system verifies that a digital signature of the application manifest corresponds to a public key of a user manifest for the associated user. The computer system verifies that an application identifier of the application manifest matches an application identifier of the user manifest. The computer system verifies that the data objects belong to the software application by comparing the application data objects to one or more data object identifiers in the application manifest.

The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 1:
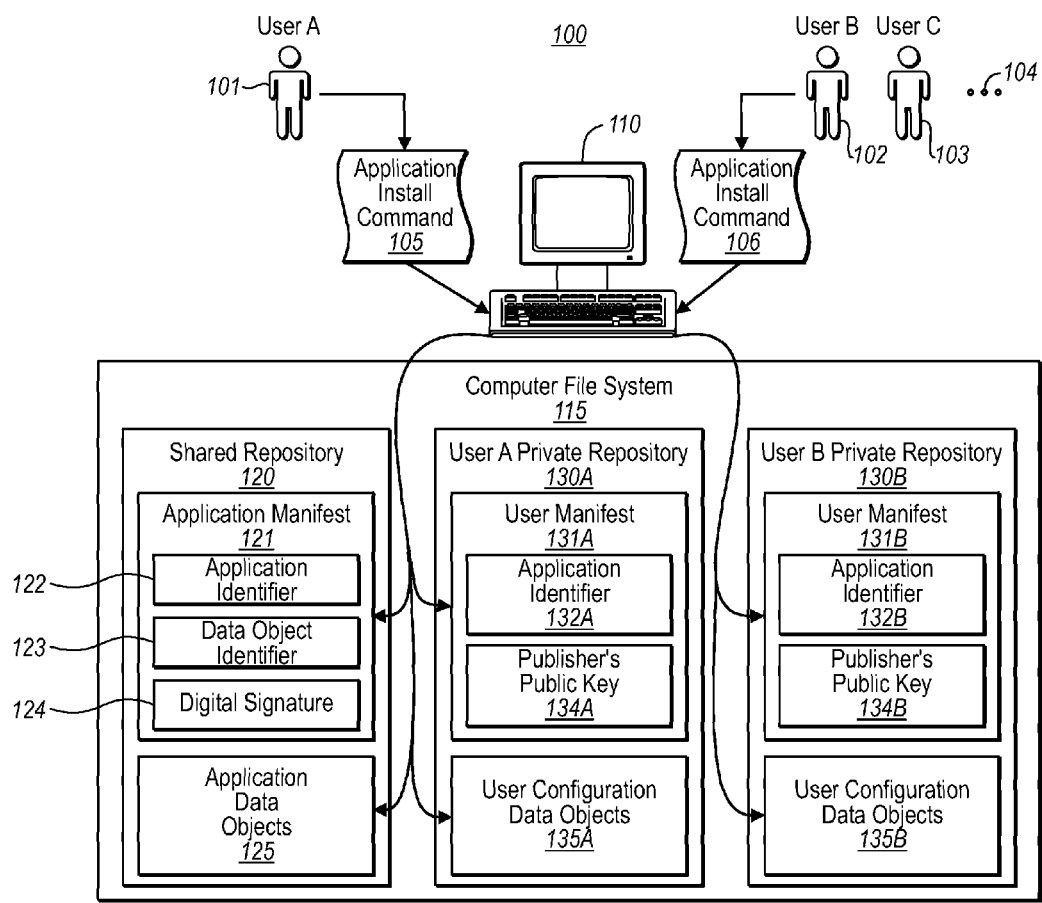
FIG. 1 illustrates a computing environment in which embodiments of the present invention may operate including securely sharing applications installed by unprivileged users.

FIG. 1 illustrates an environment 100 (e.g., a computer architecture) in which the principles of the present invention may be employed. The environment 100 includes a computer system 110 and computer system users A, B, and C (101, 102, and 103, respectively). As explained above, the computer system 110 may be any type of general or special purpose computer and may include any computing device capable of processing instructions. In some embodiments, computer users (101-103) may be capable of installing software applications. As illustrated in FIG. 1, User A (101) may enter application install command 105 into computer system 110. Similarly, computer users B and C (102 and 103) may also enter application install commands 106. Although in FIG. 1 User C 103 is not illustrated as having entered an install command 106, both User C and any other users (as represented by ellipses 104) may be capable of installing applications on computer system 110. Computer users (101-103) may enter application install commands directly at computer system 110, or remotely from a separate computer system.

In one embodiment, User A 101 enters an application install command 105 to install an application, for example, Application Z. User B 102 may also enter an application install command 106 to install Application Z, subsequent to User A's install command 105. As illustrated in FIG. 1, User A may represent the first computer user to initiate an application install command. Similarly, User B represents a computer user who is subsequently initiating an application install command 106 to install the same application as User A (in this case Application Z). In some embodiments, the computer system 110 may process the first install command 105 in a different manner than the second, subsequent install command 106.

For example, in some embodiments, if computer system 110 receives application install command 105 from User A to install, for example, Application Z, computer system 110 may install an application manifest 121 and application data objects 125 in a shared repository 120 in the computer file system 115. A shared repository (e.g. shared repository 120) is a storage area capable of storing data items. For example, shared repository 120 may be a shared file directory where computer users (101-103) may store data items such as an application manifest 121 and/or application data objects 125.

Because the repository is shared, all computer users (101-103) have access to data objects in the shared repository 120. In some cases, computer users (101-103) may be able to read, write, modify, delete, execute, or otherwise alter any data or executable files within the shared repository 120. Such users are privileged users; or in other words, the users are privileged with full access to alter and/or execute the data files within the shared repository 120.

Unprivileged users can lack the privilege or ability to alter and/or execute files. Depending on the privilege level set for any one user, that user may have limited access to files within certain directories. For example, if User A was an unprivileged user and had a very low privilege level, User A may have read-only access to files within a directory. Different privilege levels can grant a user more or less abilities to modify and/or execute files.

An application manifest, as used herein, is an item of information that may include one or more identifying objects from the application's publisher. In some embodiments, an application manifest 121 may include an application identifier 122, a data object identifier 123, and a digital signature 124. An application identifier 122, as used herein, is an item of information that includes details about the application. For instance, an application identifier 122 may include the application's name, version, serial number, date of publication, total size (in bytes), number of accompanying files or any other piece of information that might help to identify an application.

A data object identifier 123, as used herein, is an item of information that includes details about the data objects (e.g. files) within the application. For example, data object identifier 123 may include file names, version, timestamps, sizes, checksums or hashes. A digital signature 124, as used herein, is an item of information that represents an application publisher's signature on the manifest file. For example, digital signature 124 may be a certificate, signature, or other means of representing authenticity, specifically representing that the application publisher is the actual author of the manifest signed. Application data objects 125, as used herein, are data and/or executable files associated with an application. For example, application data objects 125 may be associated with an application such as Application Z in the above example. In such a case, the application data objects 125 may represent any files associated with Application Z.

Additionally, when User A initiates an application install command 105 to install Application Z (continuing above example), computer system 110 may also install a user manifest 131A and user configuration data objects 135A in a private user repository 130A in computer file system 115. A private repository (e.g. User A private repository 130A) is a storage area capable of storing data items. For example User A private repository 130A may store data items such as a user manifest and/or user configuration data objects.

A user manifest, as used herein, is an item of information that may include one or more identifying objects from the application's publisher. For example, user manifest 131A includes an application identifier 132A and a publisher's public key 134A. Application identifier 132A corresponds to application identifier 122. As will be explained below, ensuring that application identifiers 122 and 132A correspond is part of a method for securely sharing applications installed by unprivileged users.

A publisher's public key 134A, as used herein, is an item of information that includes identifying information about the application's publisher. As will be explained below, a publisher's public key 134A can be used to verify digital signature 124. User configuration data objects 135A, as used herein, are data configuration files for the user who installed the application. Data configuration files 135A may be used to store, for example, application preferences, functionality settings, usernames, passwords, or any other type of configuration data. Continuing the above example, if User A installed Application Z, User A's configuration files may be stored in User A's private repository 130A.

In some embodiments, User B's private repository 130B may have substantially the same elements as User A's private repository. For instance, User B's private repository 130B may contain a user manifest 131B and user configuration data objects 135B. As will be explained in greater detail below, when User B or any user installing an application (e.g. Application Z) subsequent to the first user who installed the application (in this example, User A), computer system 110 may install user manifest 131B (including application identifier 132B and publisher's public key 134B) and user configuration data objects 135B in user B private repository 130B in computer file system 115. Installation of application data objects 125 and an application manifest in the shared repository 120 is not required for User B or any user installing an application on computer system 110 that was previously installed.

Figure 2:
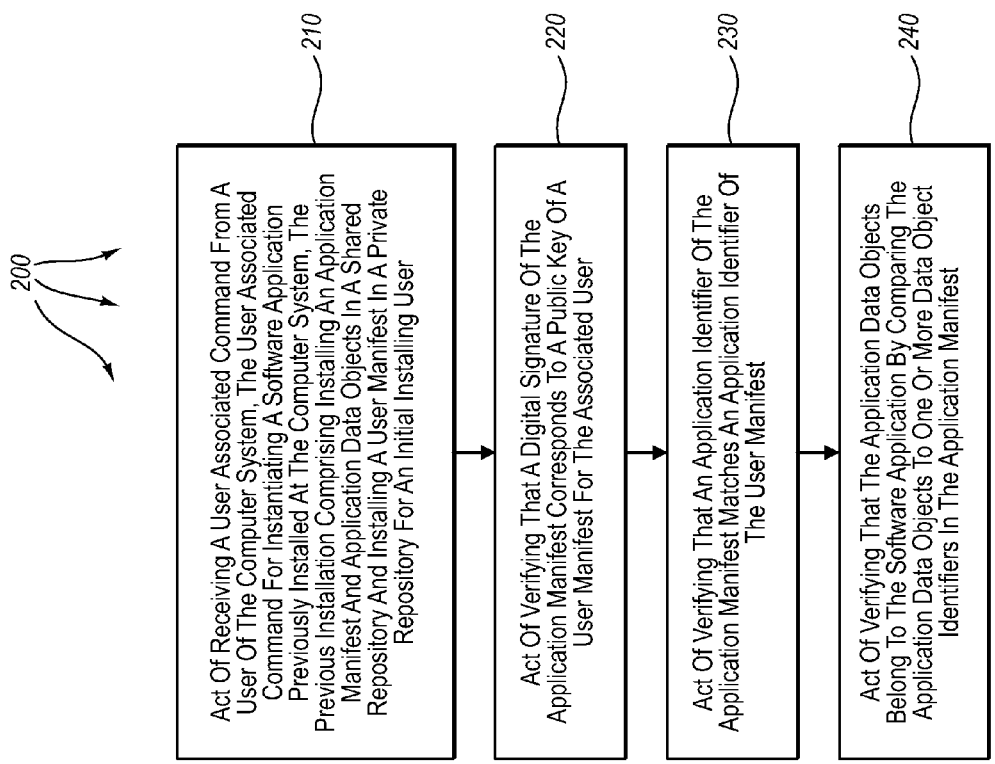
FIG. 2 illustrates a flowchart of a method for securely sharing applications installed by unprivileged users.

FIG. 2 illustrates a flowchart of a method 200 for securely sharing applications installed by unprivileged users. The method 200 will now be described with frequent reference to the components and data of environment 100.

Method 200 includes an act of receiving a user associated command to instantiate a software application previously installed at the computer system, the previous installation comprising installing an application manifest and application data objects in a shared repository and installing a user manifest and user as configuration data objects in the user's private repository, the user associated command associated with a user of the computer system (act 210). For example, computer system 100 may receive application install command 105 from User B 102 to instantiate a software application previously installed at computer system 110 where the previous installation included installing an application manifest 121 and application data objects 125 in a shared repository 120 and installing a user manifest 131A and user configuration data objects 135A in User A private repository 130A.

In some embodiments, users can install application files in a shared folder and install configuration files specific to each user in a private folder unique to that user. For example, in the above situation, User A 101 and User B 102 both use computer system 110. User A 101 may enter an application install command 105 to install, for example, Application Z. Computer system 110 may respond to the command 105 by installing an application manifest 121 and application data objects 125 for Application Z in shared repository 120. Computer system 110 may also install a user manifest 131A and user configuration data objects 135A in user A private repository 130A.

Continuing this example, User B then enters an application install command 106 to install the same application, in this case Application Z. Computer system 110 then refrains from installing an application manifest 121 or application data objects 125 in the shared repository 120 because the manifest 121 and data objects 125 were previously installed when User A 101 entered install command 105. Computer system 110 installs a user manifest 131B and user configuration data objects 135B in user B private repository 130B. This procedure occurs for all subsequent attempts to install, in this case, Application Z. Computer system 110 may be configured to create as many private repositories as there are users, and allow each user access to the application manifest 121 and application data objects 125 in shared repository 120. Thus, a single copy of application data objects is installed and subsequently shared by multiple users thereby freeing up system resources (e.g., storage space) for other users.

In some embodiments, computer system 110 may be configured to lock the data objects in the shared repository that are being used by one or more computer system users. For example, if User A was using a data file in shared repository 120, all other users would be prevented from modifying that data file until User A was finished using it. In other embodiments, a computer system user who initiates an update or patch may request an exclusive lock on the application data objects and wait until the computer system grants the exclusive lock, thus enabling the user to update or modify the application data objects without risking a simultaneous modification. In many cases, simultaneous file modification can lead to corrupt data. Thus, it may be advantageous to have a user, for example User A, request an exclusive lock on the application data objects for the application that is to be updated. Once the computer system grants the exclusive lock, the user may update, patch, or otherwise modify the data objects without risking any simultaneous modification. In some cases, unprivileged users may be prevented from updating or patching a software application.

In some embodiments, the application manifest 121 may include at least one of an application identifier 122, a data object identifier 123, or a digital signature 124 signed by the publisher of the software application. Furthermore, a user manifest 131A may comprise at least one of an application identifier 132A or a public key of the publisher of the software application 134A. In some embodiments, application data objects in the shared repository include executable and data files for the software application. Also, in some cases data object identifier 123 may include at least one of the following: name, version, timestamp, size, checksum, or hash code of the data object.

In some embodiments, an application (e.g. Application Z) has been previously installed on computer system 110, by an unprivileged user. Furthermore, Application Z may have been subsequently installed by one or more unprivileged computer users (e.g. Users B 102 and C 103). Because the application files were installed to a shared directory in this example, security may be an issue. For example, because the shared directory 120 is accessible to all users, the files in that directory may be modified by any user. Thus, it may be advantageous to verify, before running the application, that the application the user is trying to run is indeed the one the user expected and not an application that has been altered or substituted by a malicious user.

Thus, method 200 includes an act of verifying that a digital signature of the application manifest corresponds to a public key of a user manifest for the associated user (act 220). For example, computer system 110 may be configured to verify that digital signature 124 of the application manifest 121 corresponds to publisher's public key 134A of user manifest 131A for the associated user, User A. If appropriate, for example, when the two match, then computer system 110 may continue to process the application, as the manifest it has been provided by the correct publisher and has not been modified. If, however, the digital signature 124 of the application manifest 121 does not correspond to publisher's public key 134A of user manifest 131A for the associated user, User A, computer system 110 may abort processing the application.

In some embodiments, one or more executable or data files of the software application may also be digitally signed. By verifying that the digital signatures of these files (the application publisher's digital signature) corresponds to publisher's public key 134A (the application publisher's public key stored in User A's private repository 130A), User A may be sure that the executable or data files have been provided by the correct publisher and have not been modified. Other methods of verification are also possible, as explained below.

Method 200 includes an act of verifying that an application identifier of the application manifest matches an application identifier of the user manifest (act 230). For example, computer system 110 may verify that application identifier 122 of the application manifest 121 matches application identifier 132A of the user manifest 131A. Act 220 confirmed that the application manifest 121 stored in the shared repository was provided by the correct publisher and has not been altered. In act 230, computer system 110 compares the application identifier 122 in the application manifest 121 to the application identifier (e.g. 132A) in the user manifest 131A stored in the user's private repository (e.g. 130A). If the two match, then computer system 110 may continue to process the application, as it is the application expected. If, however, the application identifier in the user private repository (e.g. 130A) does not match the application identifier 122 in the shared repository 120, computer system 110 may abort processing the application.

Method 200 also includes an act of verifying that the application data objects belong to the software application (and, for example, and have not been altered) by comparing the application data objects to one or more data object identifiers in the application manifest (act 240). For example, computer system 110 may verify that application data objects 125 belong to a software application (e.g. Application Z) by comparing the application data objects 125 to one or more data object identifiers 123 in the application manifest 121. In some embodiments, data object identifiers may include file name, version, timestamp, size, checksum, or hash code, or any other means of identifying a data object. Computer system 110 may, for example, compare the checksum of one file to the actual file as the file is being loaded (i.e. a runtime check). If the stored checksum from the application manifest 121 matches the checksum generated at runtime, then it can be determined that the file belongs to that application.

In an effort to save time and processing power, partial-object hashing may be used. For example, data object identifiers 123 may include multiple hash codes for each of one or more application data objects 125. In this case, each hash code represents the hash of some portion of the data object. At runtime, instead of having to hash an entire data object, computer system 110 can identify only the portion of the data object that is needed by the application, by using the hash code for that portion of the object. Provided that no portion of the data object is accessed without checking the corresponding hash, this has equivalent security to hashing the entire file.

Figure 3:
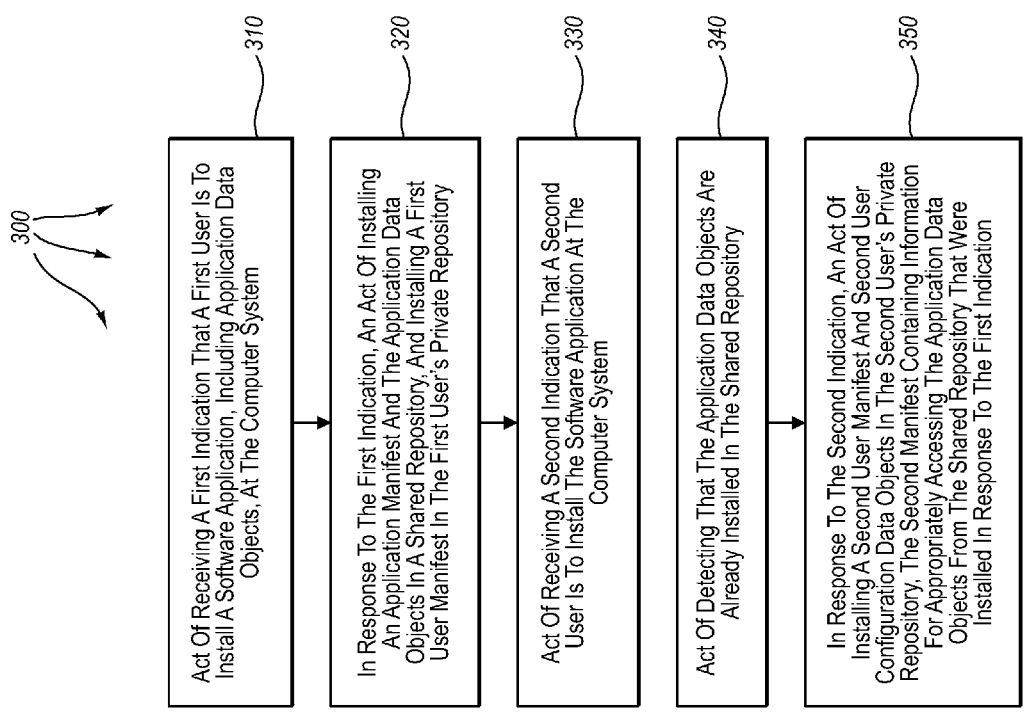
FIG. 3 illustrates a flowchart of an embodiment of a method for securely sharing applications installed by unprivileged users.

FIG. 3 illustrates a flowchart of a method 300 for securely sharing applications installed by unprivileged users. The method 300 will now be described with frequent reference to the components and data of environment 100.

Method 300 includes an act of receiving a first indication that a first user is to install a software application, including application data objects, at the computer system (act 310). For example, computer system 110 may receive a first application install command 105 indicating that User A is to install a software application (e.g. Application Z), including application data objects 125. As explained above, computer system 110 may receive an application install command 105 from a remote computer system (not illustrated) or the command 105 may be entered directly into computer system 110.

Method 300 also includes, in response to the first indication, an act of installing an application manifest and the application data objects in a shared repository, and installing a first user manifest and first user configuration data objects in the first user's private repository. For example, in response to application install command 105, computer system 110 may install application manifest 121 and application data objects 125 in shared repository 120, and install User A's user manifest 131A and user configuration data objects 135A. In some embodiments, the application manifest 121 may include application identifier 122, data object identifier 123, and digital signature 124 signed by the publisher of the software application. As explained above, data object identifier 123 may include any of the following: name, version, timestamp, size, checksum, or hash code. Furthermore, the user manifest may include application identifier 132A and/or publisher's public key 134A of the publisher of the software application.

Method 300 also includes an act of receiving a second indication that a second user is to install the software application at the computer system. For example, computer system 110 may receive an application install command 106 from User B 102 to install the software application (e.g. Application Z) on computer system 110. As explained above, a subsequent application install command 106 may come from Users B 102 or C 103 or any other computer user (as represented by ellipses 104).

Method 300 also includes an act of detecting that the application data objects are already installed in the shared repository. For example, computer system 110 may detect that application data objects 125 are already installed in shared repository 120. In some embodiments, computer system 110 may detect the presence or absence of application data objects 125 using a standard file search for files stored in shared directory 120 specific to that application.

Method 300 also includes, in response to the second indication, an act of installing a second user manifest and second user configuration data objects in the second user's private repository, the second manifest containing information for appropriately accessing the application data objects from the shared repository that were installed in response to the first indication. For example, in response to application install command 106, computer system 110 may install a user manifest 131B and user configuration data objects 135B in user B private repository 130B. Continuing this example, user manifest 131B may contain information for appropriately accessing application data objects 125 from shared repository 120 that were installed in response to application install command 105.

Thus, each user may install an application, regardless of their privilege level, and each user may share the application data objects 125, while storing user-specific configuration files 135A in their own private directories 130A. Moreover, these applications may be securely shared as each time an application is run, a series of validations may be run to ensure authenticity: the application identifiers may be verified, the data objects may be individually identified, and the application publisher's digital signature may be verified using a corresponding public key of the publisher.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system, the computer system including a processor and system memory, the computer system accessible to a plurality of different users that share applications installed at the computer system, each user instantiating shared applications through the interoperation between components in a shared repository and components in a user specific private repository, a method for securely sharing a software application between users at the computer system, the method comprising:
an act of receiving a user entered command from a specified user, the specified user being one of the plurality of users that share applications at the computer system, the user command instructing the computer system to instantiate a shared software application for use by the specified user, the shared software application having been previously installed for use by the specified user, the previous installation including at least installing one or more shared application data objects in a shared repository and installing at least a user manifest corresponding to the shared software application and one or more user specific configuration data objects in a user specific private repository for the specified user, the user manifest including:
an first application identifier for identifying the shared software application stored in the shared repository; and
a public key for a publisher of the shared software application;
an act of accessing an application manifest for the shared software application from the shared repository in response to the user entered command, the application manifest including:
a second application identifier for identifying the shared software application stored in the shared repository;
a digital signature representing the publisher's signature on the application manifest file; and
one or more data object identifiers detailing characteristics of appropriate application data objects for executing the shared software application;
prior to permitting the shared software application to run at the computer system for use by the specified user, an act of processing the shared software application to verify security of the shared software application by verifying aspects of the application manifest stored in the shared repository, including:
an act of the processor using the public key of the publisher to verify the publisher's signature on the application manifest for authenticity and to verify that the publisher is the author of the application manifest prior to relying on information contained in the application manifest to perform further verifications for the shared software application;
an act of verifying that the first application identifier matches the second application identifier; and
an act of verifying that the application data objects are appropriate for executing the shared software application by comparing the application data objects to characteristics detailed in the one or more data object identifiers; and
upon verifying each of the aspects of the application manifest, an act of running the shared software application using the installed user specific configuration data objects that specify how the application is to be run for the user, wherein the shared application data objects in the shared repository are locked while the application is running such that other users are prevented from modifying the shared application data objects.

2. The method of claim 1, wherein application data objects in include executable and data files for the shared software application.

3. The method of claim 2, wherein at least one of the executable files or the data files for the shared software application are digitally signed.

4. The method of claim 1, wherein the one or more data object identifier detail at least one of the following for the shared software application: a name, a version, a timestamp, a size, a checksum, or a hash code.

5. The method of claim 4, wherein partial hash codes are stored for one or more application data objects.

6. At a computer system, the computer system including a processor and system memory, the computer system accessible to a plurality of different users that share applications installed at the computer system, each user instantiating shared applications through the interoperation between components in a shared repository and components in a user specific private repository, a method for installing a shared software application for use by a plurality of users on a computer system, the method comprising:
an act of receiving an indication that a first user is requesting to install a software application at the computer system for use by the first user;
in response to the indication:
an act of installing application data objects for the software application in the shared repository;
an act of installing an application manifest for the software application in the shared repository, the application manifest including:
an application identifier for identifying the software application stored in the shared repository;
a digital signature representing a signature of a publisher of the software application on the application manifest file; and
one or more data object identifiers detailing characteristics of appropriate application data objects for executing the software application; and
an act of installing a first user manifest for the first user and one or more user specific configuration data objects in a user specific private repository for the first user, the first user manifest for use by the first user to verify the security of the shared software application by verifying aspects of the application manifest stored in the shared repository in response to a request by the first user to run the software application, the first user manifest including:
a first application identifier for identifying the software application installed in the shared repository; and
a public key for the publisher of the software application for verifying the publisher's signature on the application manifest for authenticity and for verifying that the publisher is the author of the application manifest prior to relying on information contained in the application manifest to perform further verifications for the shared software application; and
an act of receiving a subsequent indication that a second user is requesting to install the software application at the computer system for use by the second user, the subsequent indication received after installing the application manifest and the application data objects in the shared repository;

in response to the second indication:

an act of detecting that the application manifest and the application data objects were previously installed in the shared repository;

an act of refraining from installing the application manifest and application data objects in the shared repository in response to detecting that the application manifest and application data objects were previously installed;

an act of installing a second user manifest in a user specific private repository for the second user, the second user manifest for use by the second user to verify the security of the shared software application by verifying aspects of the application manifest stored in the shared repository in response to a request by the second user to run the software application, the second manifest containing information for appropriately accessing the application data objects from the shared repository that were installed in response to the indication, the second user manifest including:

a second application identifier for identifying the software application installed in the shared repository; and the public key for the publisher of the software application; and upon verifying each of the aspects of the application manifest, an act of running the shared software application using the installed user specific configuration data objects that specify how the application is to be run for the user, wherein the shared application data objects in the shared repository are locked while the application is running such that other users are prevented from modifying the shared application data objects.

7. The method of claim 6 wherein the one or more data object identifiers detail at least one of the following for the software application: a name, a version, a timestamp, a size, a checksum, or a hash code.

8. A computer system for allowing one or more unprivileged computer system users to install and share software applications through interaction between components in a shared repository and components in user specific private repositories, the system comprising:

one or more processors;

system memory;

wherein the shared repository is accessible by all users of the computer system;

a plurality of user specific private repositories, each user having access to a corresponding user specific private repository that includes one or more user specific configuration data objects for use with a shared software application stored in the shared repository;

an application manifest for the shared software application stored in the shared repository, the application manifest comprising:

an application identifier for identifying the shared software application stored in the shared repository;

a digital signature representing a signature of a publisher of the shared software application on the application manifest; and one or more data object identifiers detailing the characteristics of appropriate application data objects for executing the shared software application; and a user manifest for each user of the computer system that has installed the shared software application, each user manifest stored in the corresponding user specified private repository for the user, each user manifest comprising:

a further application identifier for identifying the software application installed in the shared repository; and a public key for the publisher of the software application;

prior to permitting the shared software application to run at the computer system for use by a specified user, an act of verifying security of the shared software application, verification including:

an act of using the public key included in a user manifest for the specified user to verify the publisher's signature on the application manifest, verification of the publisher's signature verifying that the application manifest is authentic and that the publisher is the author of the application manifest;

an act of verifying that the application identifier of the application manifest matches the further application identifier included in the user manifest for the specified user subsequently and in response to verifying the publisher's signature is authentic; and an act of verifying that the data objects are appropriate for executing the shared software application by comparing the application data objects to characteristics detailed in the one or more data object identifiers; and upon verifying each of the aspects of the application manifest, an act of running the shared software application using the installed user specific configuration data objects that specify how the application is to be run for the user, wherein the shared application data objects in the shared repository are locked while the application is running such that other users are prevented from modifying the shared application data objects.

9. The computer system of claim 8 wherein the one or more data object identifiers detail at least one of the following for the shared software application: a name, a version, a timestamp, a size, a checksum, or a hash code.

10. The method as recited in claim 1, wherein the act of verifying that first application identifier matches the second application identifier comprises an act of verifying that first application identifier matches the second application identifier subsequently and in response to verifying the publisher's signature is authentic.

11. The method as recited in claim 1, wherein the act of verifying that the application data objects are appropriate for executing the shared software application by comparing the application data objects to characteristics detailed in the one or more data object identifiers comprises an act of comparing the application data objects to characteristics detailed in the one or more data object identifiers subsequently and in response to verifying that first application identifier matches the second application identifier.

* * * * *